United States Patent
Dees et al.

(10) Patent No.: US 12,414,174 B2
(45) Date of Patent: *Sep. 9, 2025

(54) WIRELESS COMMUNICATION SYSTEM

(71) Applicant: KONINKLIJKE PHILIPS N.V., Eindhoven (NL)

(72) Inventors: Walter Dees, Eindhoven (NL); Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,315

(22) Filed: Mar. 23, 2023

(65) Prior Publication Data

US 2023/0232475 A1 Jul. 20, 2023

Related U.S. Application Data

(63) Continuation of application No. 17/536,151, filed on Nov. 29, 2021, now Pat. No. 11,641,683, which is a
(Continued)

(30) Foreign Application Priority Data

Dec. 29, 2016 (EP) .................................. 16207320

(51) Int. Cl.
*H04W 76/14* (2018.01)
*G01S 13/76* (2006.01)
(Continued)

(52) U.S. Cl.
CPC ............. *H04W 76/14* (2018.02); *G01S 13/76* (2013.01); *H04M 1/72412* (2021.01);
(Continued)

(58) Field of Classification Search
CPC ....... H04W 76/14; H04W 4/023; H04W 4/80; H04W 64/00; H04W 76/10; H04W 48/20;
(Continued)

(56) References Cited

U.S. PATENT DOCUMENTS 5,365,516 A * 11/1994 Jandrell ................ G01S 5/0009
370/335
9,774,996 B1 * 9/2017 Frydman ................ G01S 13/46
(Continued)

FOREIGN PATENT DOCUMENTS

EP 2913689 A2 9/2015
EP 3107347 A1 12/2016
(Continued)

OTHER PUBLICATIONS

PCT International Search Report, International application No. PCT/EP2017/084451, Jun. 8, 2018.

*Primary Examiner* — Lewis G West

(57) ABSTRACT

A wireless communication system comprises a host device (110) and mobile devices (120) arranged for wireless communication and for distance (140) measurement. The host device has a user interface (113) comprising a connect button (115), and is arranged to execute a connection sequence upon a user activating the connect button. The connection sequence first determines respective distances between the host and respective mobile devices. A first mobile device is identified exhibiting a movement. Then a connection action is executed regarding a connection between the first mobile device and the host device. The mobile device is arranged for executing a ranging protocol and, upon subsequently receiving a connection message, executing a connection action regarding a connection between the first mobile device and the host device. Effectively a connection may be established upon the user of a
(Continued)

mobile device pressing a single button on a selected host device and moving the mobile device.

19 Claims, 6 Drawing Sheets

Related U.S. Application Data continuation of application No. 16/474,078, filed as application No. PCT/EP2017/084451 on Dec. 22, 2017, now Pat. No. 11,202,326.

(51) Int. Cl.
*H04M 1/72412* (2021.01)
*H04W 4/02* (2018.01)
*H04W 4/80* (2018.01)
*H04W 64/00* (2009.01)
*H04W 76/10* (2018.01)

(52) U.S. Cl.
CPC ............ *H04W 4/023* (2013.01); *H04W 4/80* (2018.02); *H04W 64/00* (2013.01); *H04W 76/10* (2018.02)

(58) Field of Classification Search
CPC ............ G01S 13/76; H04M 1/72412; H04M 1/72516; G06F 1/1632; H04L 43/0864
See application file for complete search history.

(56) References Cited

U.S. PATENT DOCUMENTS

| | | | |
|---|---|---|---|
| 9,913,208 B1* | 3/2018 | Chu | G01S 5/02 |
| 11,202,326 B2* | 12/2021 | Dees | H04W 64/00 |
| 11,641,683 B2* | 5/2023 | Dees | H04W 48/20 |
| | | | 455/41.2 |
| 2007/0287386 A1 | 12/2007 | Agrawal et al. | |
| 2010/0112950 A1 | 5/2010 | Haartsen et al. | |
| 2014/0259136 A1 | 9/2014 | Levy | |
| 2015/0139213 A1* | 5/2015 | Abraham | H04L 69/28 |
| | | | 370/338 |
| 2015/0379678 A1* | 12/2015 | Al-otoom | G06T 1/60 |
| | | | 345/537 |
| 2016/0316335 A1* | 10/2016 | Roberts | H04L 43/0864 |
| 2016/0345254 A1* | 11/2016 | Iwami | H04W 76/10 |
| 2018/0084384 A1* | 3/2018 | Venkatraman | H04W 64/00 |
| 2018/0084537 A1* | 3/2018 | Do | H04L 63/107 |
| 2018/0098299 A1* | 4/2018 | Chae | H04J 11/00 |
| 2018/0335514 A1 | 11/2018 | Dees | |
| 2023/0362722 A1* | 11/2023 | Dees | H04L 69/22 |

FOREIGN PATENT DOCUMENTS

| | | |
|---|---|---|
| JP | 2012227969 A | 11/2012 |
| WO | WO2013054232 A1 | 4/2013 |
| WO | WO2013076625 A1 | 5/2013 |
| WO | WO2013114263 A1 | 8/2013 |

* cited by examiner

WIRELESS COMMUNICATION SYSTEM

CROSS REFERENCE TO RELATED APPLICATIONS

This application is a continuation of U.S. application Ser. No. 17/536,151 filed Nov. 29, 2021 which is a continuation of U.S. application Ser. No. 16/474,078 filed Jun. 27, 2019 which is the US National Stage Application of PCT/EP2017/084451 filed Dec. 22, 2017 which claims priority to EP Application Serial No. 16207320.9 filed Dec. 29, 2016.

FIELD OF THE INVENTION

The invention relates to a host device and mobile devices arranged for wireless communication, and methods and computer program products for use in such devices. The mobile device comprises a mobile transceiver and a mobile processor, the mobile transceiver being arranged for wireless communication according to a communication protocol, and the mobile processor being arranged for distance measurement via a ranging protocol in the communication protocol for determining a distance between the host and the mobile device based on a round trip time measurement. The host device comprises a host transceiver for wireless communication according to the communication protocol, a host processor arranged for distance measurement via the ranging protocol, and a user interface.

The present invention relates to the field of short-range wireless communication systems, e.g. indoor communication systems, and more in particular provides various devices and methods for setting up wireless connections based on distance measurements as well as corresponding computer program products.

BACKGROUND OF THE INVENTION

Document WO2013/076625 describes a system for configuration and control of wireless docking. A portable device and a docking station cooperate to provide automatic docking. The portable device detects the docking station in the wireless environment, and a communication path is established. A received signal characteristic is measured and compared to a threshold. For example, when a measured signal strength exceeds the threshold, docking is completed.

SUMMARY OF THE INVENTION

The above example of automatic docking is an example of setting up a connection between a mobile device and a host device. The user only has to bring his mobile device within reception range of the host device. However, in the known system the automatic setting up of a connection may be confusing to the user, in particular when there are multiple possible host devices and/or multiple mobile devices. Also, the setting up may be unreliable due to unexpected variations in received signal strength.

It is an object of the invention to provide a system for reliably setting up a connection between a host device and a mobile device, when the mobile device is within wireless reception range.

For this purpose, devices and methods are provided as defined in the appended claims.

According to an aspect of the invention a host device is provided arranged for wireless communication with mobile devices, each mobile device comprising a mobile transceiver and a mobile processor, the mobile transceiver being arranged for wireless communication according to a communication protocol, the mobile processor being arranged for distance measurement via a ranging protocol for determining a distance between the host and the mobile device based on a round trip time measurement, the host device comprising
   a host transceiver for wireless communication according to the communication protocol,
   a host processor arranged for distance measurement via the ranging protocol, and
   a user interface comprising a connect button,
the host processor being arranged to execute a connection sequence upon a user activating the connect button,
the connection sequence comprising
   determining, by executing the ranging protocol with respective mobile devices in wireless communication range, one or more respective distances, each respective distance being between the host and a respective mobile device,
   detecting whether a first mobile device exhibits a movement with respect to the host device, and, if so,
   executing a connection action regarding a connection between the first mobile device and the host device.

According to a further aspect of the invention a wireless communication system is provided comprising the above host device and a mobile device, the mobile device comprising a mobile transceiver and a mobile processor, the mobile transceiver being arranged for wireless communication according to the communication protocol, the mobile processor being arranged for
   executing the ranging protocol;
   receiving a connection message from the host device within a responsive period starting upon said executing the ranging protocol; and, in response to the connection message,
   executing a connection action regarding a connection between the mobile device and the host device.

According to a further aspect of the invention there is provided a host method for use in a host device for wireless communication with mobile devices,
   each mobile device comprising a mobile transceiver and a mobile processor,
   the mobile transceiver being arranged for wireless communication according to a communication protocol,
   the mobile processor being arranged for distance measurement via a ranging protocol for determining a distance between the host and the mobile device based on a round trip time measurement,
   the host device comprising
      a host transceiver for wireless communication according to the communication protocol,
      a host processor arranged for distance measurement via the ranging protocol, and
      a user interface comprising a connect button, the host method comprising
   detecting a user activating the connect button, and
   executing a connection sequence upon the user activating the connect button, the connection sequence comprising
      determining, by executing the ranging protocol with respective mobile devices in wireless communication range, one or more respective distances, each respective distance being between the host and a respective mobile device, detecting whether a first mobile device exhibits a movement with respect to the host device, and, if so, executing a connection action regarding a connection between the first mobile device and the host device.

According to a further aspect of the invention there is provided a mobile method for use in a mobile device for wireless communication with the above host device, the mobile device comprising a mobile transceiver and a mobile processor, the mobile transceiver being arranged for wireless communication according to a communication protocol, the mobile processor being arranged for distance measurement via a ranging protocol for determining a distance between the host and the mobile device based on a round trip time measurement, the mobile method comprising executing the ranging protocol;
indicating to a user of the mobile device to perform said movement with respect to the host device;
receiving a connection message from the host device within a responsive period starting upon said executing the ranging protocol; and, in response to the connection message,
executing a connection action regarding a connection between the first mobile device and the host device.

According to a further aspect of the invention there is provided a computer program product downloadable from a network and/or stored on a computer-readable medium and/or microprocessor-executable medium, the product comprising program code instructions for implementing the above method when executed on a computer.

In the current context, a host device may be any electronic device having the capability for setting up a connection using wireless communication, and having said connect button in an appropriate user interface. Usually the host device will be a stationary device like a PC or an access point or a wireless docking station or a wireless USB hub, or a wireless video or AV monitor, but the host may also be a portable device like a laptop or a mobile phone. The mobile device may be any portable electronic device having the capability for setting up a connection using wireless communication.

Both host and mobile device are arranged to participate in measuring the distance between both devices via a ranging protocol. The ranging protocol may be a separate wireless protocol. Optionally, the ranging protocol is part of the communication protocol. The ranging protocol may involve any predefined type of wireless communication which allows to estimate the traveling time of wireless messages between both devices. Also, a further device may be involved in the ranging protocol to determine said distance via messages as exchanged. Such wireless ranging protocols may be based on time-of-flight measurements which measure the time it takes for the electromagnetic radiation to travel between the transmitter and the receiver. The ranging protocol is for determining relatively short distances of up to a few meters or perhaps a few tens of meters using direct wireless signals only, i.e. distances where a user of a mobile device is in receiving range of a host device.

A system for distance measurement is recently developed in a new version of the protocol for wireless communication defined in IEEE 802.11. The new version comprises a ranging protocol for determining a distance between two devices, and allows for accurate distance measurement and determining location of devices up to 1 meter or even lower resolution. The ranging protocol, called Fine Timing Measurement procedure (FTM), is defined in [reference 1] IEEE 802.11REV-mc Chapter 10.24.6, and accurately measures the Round-Trip Time (RTT) of the signal using measurement messages, and derives the distance based on the measured travelling time of the messages.

Wireless ranging protocols are fundamentally different from long distance measurements, e.g. as performed using the IP/HTTP protocol using ping times, which measure the time it takes for an IP data packet to transit in a network from a source device to a sink device. Such a transit may include a number of intermediate devices. On the contrary, assuming a wireless signal propagated in free air with substantially the speed of light, it takes 3.3 ns for the radiation to cover a distance of a meter. Wi-Fi devices may be able to reach a time granularity of around 0.1 ns. In contrast, in IP protocols ping distances are in the order of ms (hence 6 orders or magnitude higher). For example, in HDCP (High Definition Content Protection) 2.0 standard, distance measurement is performed based on pinging and a received is deemed in close proximity if the round trip is less than 20 ms.

In a wireless ranging protocol messages are exchanged and time intervals are determined between sending and/or receiving such messages to determine a round trip time. For example, in the ranging protocol the first device sends a measurement message at a first time ($t1$); the second device receives the measurement message at a second time ($t2$); the second device transmits a measurement acknowledge at a third time ($t3$); and the first device receives the measurement acknowledge at a fourth time ($t4$). First time data, e.g. the values of $t1$ and $t4$ or by a difference value of $t4-t1$, represents a time interval between the first time and the fourth time, and second time data, e.g. by the values of $t2$ and $t3$ or by a difference value of $t3-t2$, represents a time interval between the second time and the third time. The distance is determined based on a travelling time of the messages between the first device and the second device, calculated by using the first time data and the second time data.

The connection sequence may be arranged to execute any action related to managing connections in a wireless communication system. In a practical example, a host device may be arranged as a docking station and may detect multiple mobile devices in receiving range being potential dockees. The docking station may be arranged to automatically dock to the closest mobile device upon pressing the connect button. In another example, a connection may be set up between an access point acting as the host and a portable device, the portable device being brought temporarily in the vicinity of the access point. The host may be arranged to have multiple connections at the same time, or may be arranged to first disconnect a previous connection and then initiate a new connection. In a practical example, a host device arranged as a docking station may be arranged to wirelessly dock to multiple devices respectively, a new connection being set up upon pressing the connect button.

The above features have the effect that, upon the user pressing said connect button, the connection sequence is initiated, in which the host ultimately executes a connection action with a mobile device that is moving. Thereto, the host is provided with said connect button in its user interface, e.g. a physical button or a virtual button on a display such as a touch screen, and is arranged to executed the connection sequence upon activating said button. The mobile device is arranged to execute the ranging protocol, and, upon completing a distance measurement, to respond to a connection action from the host device regarding a connection between the first mobile device and the host device. For example, the mobile device is arranged to automatically set up a connection to a docking station, when receiving a connection request within a predefined period from executing the ranging protocol.

So, in environments where multiple mobile devices may be present, and intuitive setup of a connection is enabled. By just one single user action, i.e. activating said connect button, the host is triggered to determine distances to mobile devices in wireless communication range. Next the device exhibiting movement with respect to the host is selected and the corresponding device is identified, which device is named the first device in the claims. Said connection action, e.g. initiating or terminating a connection between the host and the first device, is executed without further involvement of the user. So, advantageously, the user intuitively enables selecting his mobile device for the connection action by moving the mobile device in proximity of the host.

In an embodiment, the connection sequence comprises selecting a shortest distance among the respective distances, identifying a nearest mobile device among the respective devices, the nearest mobile device having said shortest distance, and executing a connection action regarding a connection between the nearest mobile device and the host device. The features have the effect that, upon the user pressing said connect button, the connection sequence is initiated, in which the host ultimately executes a connection action with said nearest device, i.e. the mobile device that is closest to the host.

In an embodiment, the connection sequence comprises determining whether there is an existing communication session between the first device and the host device according to the communication protocol, and if not, the connection action comprising initiating a new communication session between the first device and the host device according to the communication protocol. Advantageously, a connection is automatically initiated upon a single user action, while the user is clearly aware about the connection and the host to which the connection is initiated, as the user activated said connect button on the host.

In an embodiment, the connection sequence comprises determining whether there is an existing communication session between the first device and the host device according to the communication protocol, and if not, determining whether there is a further communication session between a further mobile device and the host device according to the communication protocol, and if so, the connection action comprising initiating terminating the further communication session between the further device and the host device. Advantageously, a connection is automatically terminated upon a single user action. For example, the user may take control of a host by bringing his device close to the host and pressing the connect button. An existing connection of a more remote further device will now be terminated, while a new connection is set up. The user is clearly aware about the connection and the host to which the connection is initiated, as the user activated said connect button on the host, while his mobile is closest to the host.

Optionally, the connection sequence comprises determining whether there is an existing communication session between a further device and the host device according to the communication protocol, and if so, the connection action comprising initiating terminating the existing communication session between the further device and the host device according to the communication protocol. Also, the connection sequence may comprise, when there is an existing communication session between the nearest device and the host device, selecting a second shortest distance among the respective distances, identifying a second mobile device among the respective devices, the second mobile device having said second shortest distance, and initiating a new communication session between the second device and the host device according to the communication protocol. Advantageously, by the user pressing the connect button, the connection to the host will be effectively transferred to the mobile device having the second shortest distance, while terminating the connection with the closest, first device. Moreover, by again pressing said connect button, the user may toggle said connection back to the first device, the host device using the above defined features.

In an embodiment, the connection action may comprise at least one of
 authenticating the first device according to the communication protocol;
 determining whether the first device is part of an authenticated device list, and if not, upon successful authentication of the first device, updating the authenticated device list;
 determining whether the mobile device selected for a new communication session is part of an authenticated device list, and if so, reusing previously established credentials for setting up a connection to the selected device. Advantageously, determining an authentication status and maintaining a list of authenticated devices, increases the security of the wireless communication and may speed up setting up a connection.

In an embodiment, the connection sequence comprises determining whether the distance to the mobile device selected for a new communication session is more than a predetermined connection range, and if so, continue by at least one of
 aborting the connection sequence;
 signaling to the user that the mobile device is outside the predetermined connection range;
 indicating to the user that the mobile device has to be moved towards the host;
 for a limited period, repeating the stages of determining the respective distances and selecting the shortest distance, until the shortest distance is less than the predetermined connection range, and if so, continue by executing the connection action. Advantageously, by limiting the range in which the connection action is executed, the security is increased and the risk of unintentionally connecting to a wrong device is reduced.

In an embodiment, the connection sequence comprises determining a total number of mobile devices within a predetermined connection range, and continue by at least one of
 if the total number exceeds a predetermined number, signaling to the user that total number exceeds a predetermined number of devices allowed inside the predetermined connection range;
 if the total number exceeds a predetermined number, to request the user to remove one or more mobile devices from the connection range;
 if the total number exceeds a predetermined number, aborting the connection sequence;
 if the total number is one, continue by executing said connection action while skipping said selecting and identifying. Advantageously, by limiting the total number of devices that is allowed within said connection range, the security is increased and the risk of unintentionally connecting to a wrong device is reduced.

In an embodiment, the connection sequence comprises detecting whether at least one respective mobile device exhibits a predetermined movement with respect to the host device, and, adapting the connection sequence in dependence on said predetermined movement. For example, a predetermined movement may be moving at least a predetermined distance at a predetermined minimum speed. The mobile device may be arranged to indicate a required movement to a user of the mobile device, so that the user is aware to perform such a movement with respect to the host device. Also, the may be indicated more than one movement for signaling respective different connection actions, e.g. fully terminating or just temporarily suspending a session.

Movement may be detected by consecutive distance measurements. Alternatively, movement may be detected using a separate movement detector, e.g. based on detecting Doppler shift of wireless RF signals. Advantageously, the user is enabled to confirm that the connection action is to be executed relating to his device by intentionally moving his device. Optionally, the connection sequence is adapted by at least one of:

detecting whether said nearest device exhibits said movement, and only if so setting up a new connection between the first device and the host device;
detecting whether said nearest device exhibits said movement, and only if so authenticating said first device;
detecting whether said nearest device exhibits said movement, and only if not subsequently at least one of
selecting the nearest mobile device for initiating a new communication session;
selecting the first mobile device for terminating an existing communication session. Advantageously, the connection sequence is adapted upon the user intentionally moving his device.

In an embodiment, the ranging protocol comprises transferring respective credential data from the respective mobile devices, and the host processor is arranged for using the respective credential data when executing the connection action for the respective device as selected based on the respective distances. Effectively, the credential data is now inherently linked to the device for the distance is measured, especially if the credential comprises a public key or a hash of a public key. By using said credential data, the connection action is reliably linked to that device. For example, a new connection may be set up easily to a mobile device that has been connected to the same host in a previous session before, when the mobile device stores credential data during said previous session. Also, the host and mobile may already during the ranging protocol exchange new credential data. Advantageously, the security of setting up is increased.

Optionally, the host processor is arranged for receiving at least one additional distance as measured by a mobile device, and for using the additional distance when determining the respective distance between the host and a respective mobile device. The additional distance may be a distance between the mobile device and the host, as measured by the mobile, or a further distance between the mobile device and a further mobile device. The additional measurement may be performed by the respective mobile device itself, e.g. using the ranging protocol in a reverse direction, or using a different ranging protocol like iBeacon. Now the additional measurement may be compared, by the host, to the respective distance as measured by the host. Upon a match, within reasonable tolerances, the host may consider the respective distance as verified. It may be rather difficult for a malicious mobile to equally fake a wrong distance in both the measurement by the host and the measurement reported as additional distance measurement. Also, the additional distance measurement may be performed by a different, "third" mobile device, e.g. a further laptop or mobile phone that is trusted and authenticated. Also, the third device may perform multiple distance measurements, e.g. to both the host and the respective mobile device, so as to enable verification and triangulation of positions of one or more respective mobile devices. The additional distances may be measured and/or transferred to the host in response to a request message from the host. Advantageously, the measured distances to respective devices can be made more reliable by using the additional distances.

Optionally, a host device is provided for wireless communication with mobile devices, each mobile device comprising a mobile transceiver and a mobile processor, the mobile transceiver being arranged for wireless communication according to a communication protocol, the host device comprising a host transceiver for wireless communication according to the communication protocol and a host processor, the host processor being arranged to execute an action sequence upon detecting a user action, the device being arranged to
receive wireless signals according to the communication protocol from respective mobile devices in wireless communication range,
detecting whether at least one respective mobile device exhibits a respective movement with respect to the host device, and,
executing the action sequence in dependence on said respective movement.

The above features have the effect that the action sequence as executed by the host the device is controlled based on detecting a movement of at least one mobile device within a receiving range for the wireless communication. For example, by intentionally moving a mobile device in the vicinity of a host a connection sequence may be initiated by the host device and/or the mobile device. Also, in a user interactive application, the user may be requested to actively move his mobile device within a defined time period, e.g. as notified via a display of the mobile device or the host. The movement may be required to be specific in terms of speed, range, direction and may be a pattern of sequential movements. The movement may be detected by the host based on at least two sequential distance measurements as defined above. Also, the movement may be detected based on detecting a Doppler shift in the frequency of wireless signals received from the mobile device. The mobile device may be controlled to actively transmit such wireless signals in the defined time period. The movement detection may alternatively, or additionally, be performed in the mobile device. Optionally, the movement as detected is verified by comparing a movement detected by the host device and a movement as detected by the mobile device. In a practical example, a host device arranged as a docking station may detect multiple mobile devices being potential dockees. The host may be arranged to automatically dock to one or more devices in receiving range. The docking station may alert the users of the mobile devices, that a movement of a respective mobile device may be performed to start the docking sequence for that respective mobile device. In another example, the host device may request the user to confirm a specific action or connection step, by requesting the user to move his device. Optionally, movements of the mobile device may be filtered to be above a predetermined threshold regarding range, direction and/or speed, or to have a pattern of movements, e.g. back and forth, to qualify for executing an action, or confirming a pending action, in the host.

Specific movements may be measured and, upon detection, be coupled to specific actions by the host.

A method according to the invention may be implemented on a computer as a computer implemented method, or in dedicated hardware, or in a combination of both. Executable code for a method according to the invention may be stored on a computer program product. Examples of computer program products include memory devices such as a memory stick, optical storage devices such as an optical disc, integrated circuits, servers, online software, etc. The computer program product may comprise non-transitory program code means stored on a computer readable medium for performing a method according to the invention when said program product is executed on a computer. In an embodiment, the computer program comprises computer program code means adapted to perform all the steps or stages of a method according to the invention when the computer program is run on a computer. Preferably, the computer program is embodied on a computer readable medium. There is provided a computer program product downloadable from a network and/or stored on a computer-readable medium and/or microprocessor-executable medium, the product comprising program code instructions for implementing a method as described above when executed on a computer.

Another aspect of the invention provides a method of making the computer program available for downloading, for example included in a location based application. This aspect is used when the computer program is uploaded into, e.g., Apple's App Store, Google's Play Store, or Microsoft's Windows Store, and when the computer program is available for downloading from such a store.

Further preferred embodiments of the devices and methods according to the invention are given in the appended claims, disclosure of which is incorporated herein by reference.

BRIEF DESCRIPTION OF THE DRAWINGS

These and other aspects of the invention will be apparent from and elucidated further with reference to the embodiments described by way of example in the following description and with reference to the accompanying drawings, in which.

The figures are purely diagrammatic and not drawn to scale. In the Figures, elements which correspond to elements already described may have the same reference numerals.

DETAILED DESCRIPTION OF THE EMBODIMENTS

Figure 1:
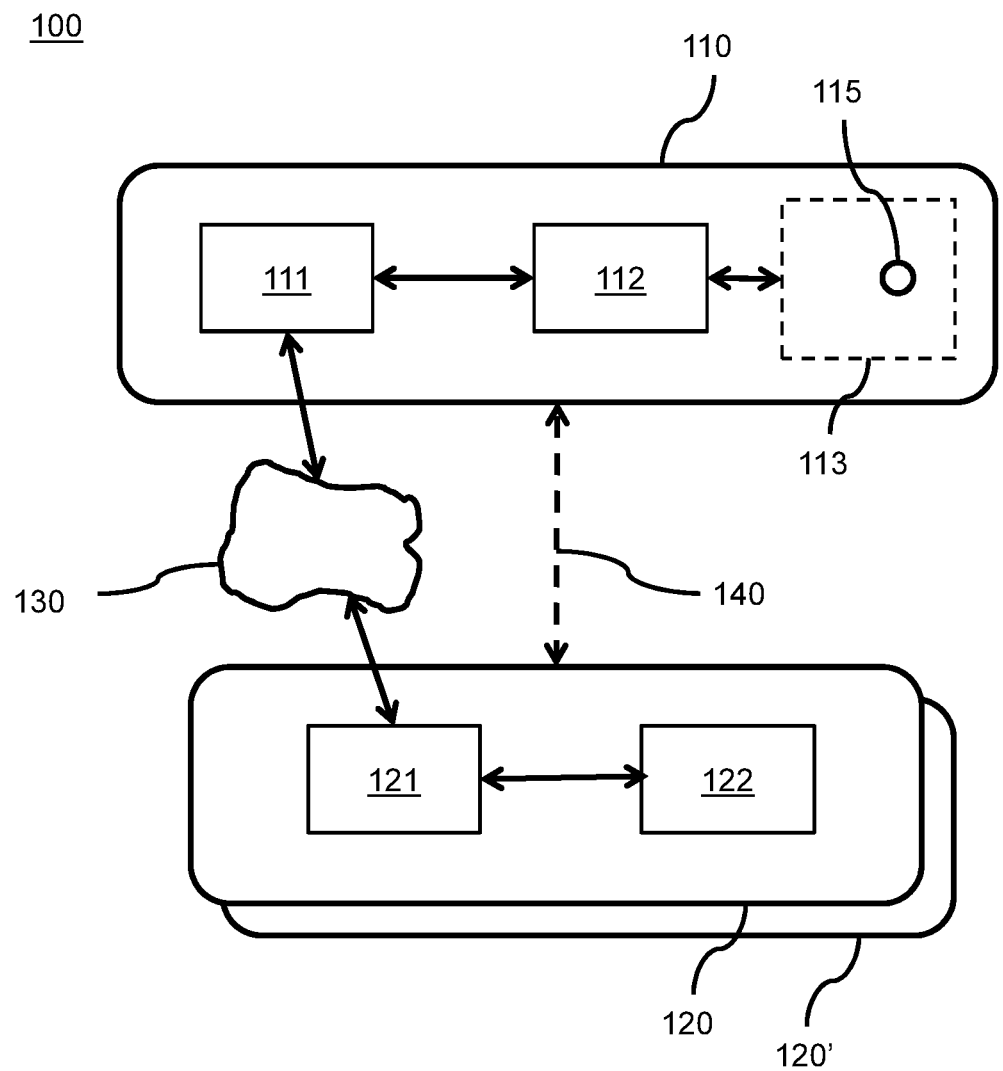
FIG. 1 shows devices for wireless communication and distance measurement.

Setting up, modifying or terminating wireless connections may occur in various application contexts, for example in docking. The proposed system achieves controlling a wireless connection between two devices, such that the user is certain that the right devices connect. Although the further examples usually relate to docking, the system may also apply to other wireless devices with some I/O function, such as Miracast devices.

Traditional docking of a laptop to a wired dock to connect to peripherals such as a monitor, keyboard and mouse to the laptop, requires a user to physically connect a cable or put an opening of the laptop with a set of connectors onto set of matching connectors on the dock. Similarly, for a smartphone, one would have to connect e.g. a Micro USB or Lightning connector to the smartphone in order to initiate docking. This physical act of connecting makes it very clear for the user that two devices, i.e. a portable device and a stationary device, are connected. Also, it is clear that only those two devices are connected, that the connection is secure and that the user has the intent to dock the portable device to the particular docking station with the peripherals connected to that docking station.

When docking wirelessly with a wireless dock it is much less clear which devices are connected. In particular, if multiple docks and multiple portable devices are within wireless range, any one of these devices may connect with one another, so the one-to-one relation is much less obvious to the user. It is much less clear which dock the portable device will connect to if multiple docks are in close vicinity from each other, e.g. in a flexible office, or which portable device the user intends to dock if he has multiple portable devices in close vicinity from each other, e.g. if he has a laptop on his desk, but also a smartphone in his pocket. It is also less clear to the user if the connection is secure or if the portable device accidently gets connected to or through a malicious device, e.g. in a man-in-the-middle attack. Furthermore, the user is likely to have to perform additional steps as part of the user interaction to dock, e.g. by selecting one of the docks to connect to in the Graphical User Interface (GUI) of the portable device. For devices such as laptops, having to operate a GUI to initiate docking, this may be is cumbersome and unpractical. For example, the laptop's lid may be closed, which is usually the case when a user carries his laptop in his bag to work or between meetings before arriving to his desk to continue working, i.e. which is typically the moment the user would like to dock with the peripherals such as the monitor, key board, mouse at his desk in order to be more productive. Also, for mobile phones, the user may find it cumbersome to go through all the menus and find the apps and/or settings to initiate docking.

For example, in a car, the user may wish to wirelessly dock with the peripherals such as the displays, controls, audio devices, etc. In order to make the user intent very clear and to minimize the user interaction steps in case of wireless docking, one could design the wireless dock in the form of a cradle in which or on top of which the portable device should be placed to trigger the portable device to automatically dock with the wireless dock, for example as described in WO2013054232A1 "Wireless Docking Link Efficiency Improvement System" and WO2013114263A1 "Wireless docking with carrier sense control". However, such systems are less suitable for large portable devices such as laptops, give less freedom to the user as to where to place the portable device and the dock, and are more complex to design and manufacture.

An alternative approach as described in WO2013076625A1 mentioned in the introduction, could minimize the user interaction by automatically connecting to a wireless dock if the portable device is within a receiving range. However, the user may not always want the portable device to be docked, e.g. when he wants to operate the device by using the screen, keys and buttons on the portable device itself. Also, the user may have multiple portable devices that are within range and only one of those devices would have to be docked. In particular, upon docking, the display should appear automatically and the operating mode on the portable device is likely to be different in docking mode then when not docked, e.g. the display on the portable device may go black whilst being docked, so this would be very confusing and annoying if this would happen to a device not intended to dock. Also, having an unnecessary docking connection is an unnecessary drain on the battery of the portable device.

FIG. 1 shows devices for wireless communication and distance measurement. A system 100 for wireless communication comprises a host device 110 and a mobile device 120, the devices being physically apart at a distance 140. A further mobile device 120' is schematically indicated also, and is similar to the mobile device 120. The host device has a host transceiver 111 and a host processor 112. Likewise, the mobile device has a mobile transceiver 121 and a mobile processor 122. The devices are equipped for wireless communication, as schematically indicated by shape 130 and arrows which connect the transceivers 111,121. The devices are arranged for wireless communication according to a communication protocol between the host device and the mobile device. The devices are arranged for distance measurement according to a ranging protocol for determining a distance between two devices, an example being detailed below with reference to FIG. 2. The communication protocol may include the ranging protocol. In the examples the communication protocol is Wi-Fi according to IEEE 802.11 [ref 1], but other wireless protocols may also be used, such as Bluetooth, when provided with an appropriate ranging protocol based on round trip time measurement.

Figure 2:
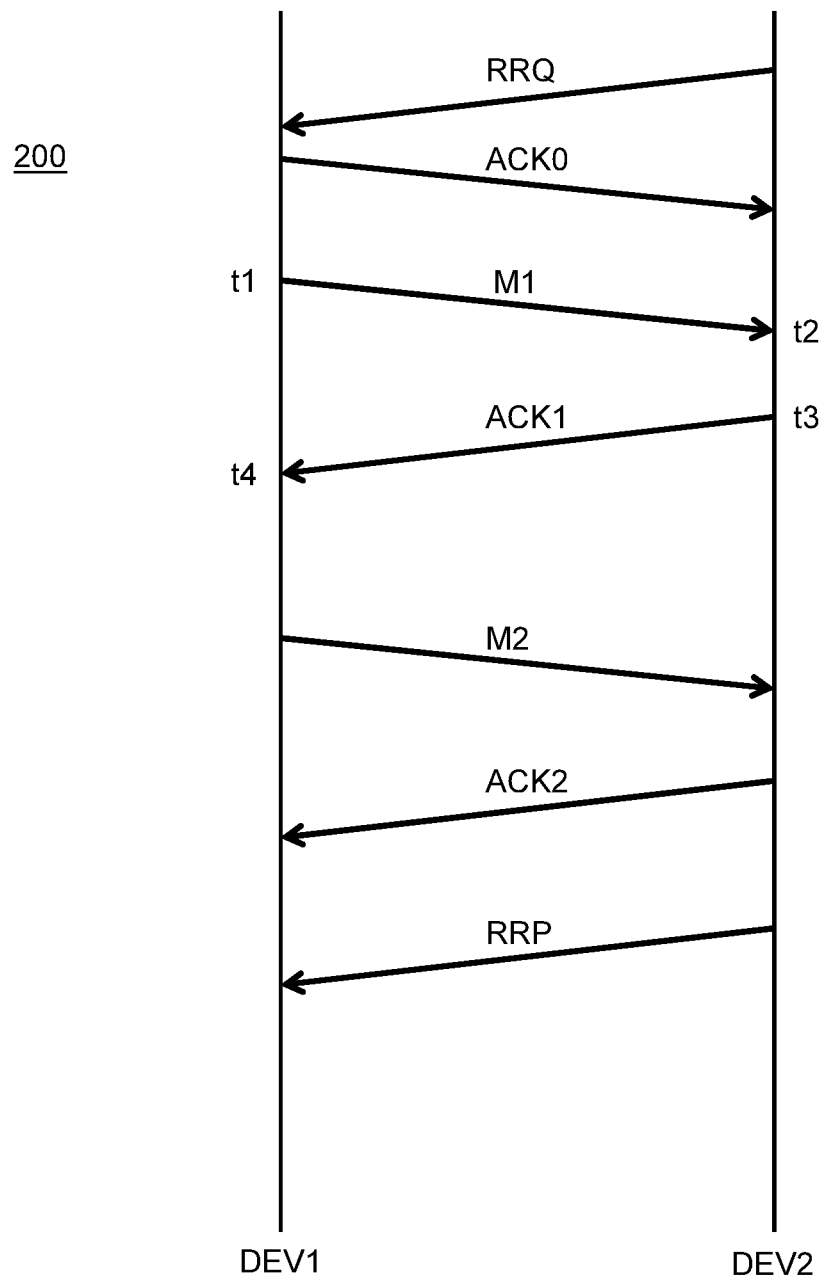
FIG. 2 shows a schematic diagram of a ranging protocol.

FIG. 2 shows a schematic diagram of a ranging protocol. According to the protocol a first device DEV1 exchanges messages to a second device DEV2 as indicated by arrows between two vertical timelines representing the progress of time in downward direction. The first device may be the host device and the second device may be the mobile device, but such roles may be reversed. Initially the mobile device sends a request message RRQ to initiate a round trip time measurement, which is a sequence of messages, time measurements and calculations as described now. The request message is acknowledged by a message ACK0 from the host device to the mobile device. It is noted that the ranging protocol may alternatively be initiated by the host device.

Subsequently the host device sends measurement message M1 at a host time t1, also called time of departure of M1. The mobile device receives the measurement message M1 at a second time t2, also called time of arrival of M1. Then the mobile device transmits a measurement acknowledge ACK1 at a third time t3, also called time of departure of ACK1, and the host device receives the measurement acknowledge ACK1 at a fourth time t4, also called time of arrival of ACK1. The time interval between t1 and t4 may be called round trip time, while the interval between t2 and t3 may be called response time. The times t1, t4 and t2, t3 are detected by a respective device processor using a local clock signal or any other available clock signal having a frequency that is high enough to represent time differences of a few nanoseconds to enable calculating distances up to a few meters travelled by the messages M1 and ACK1 during the round trip time measurement representative of the distance 140 between the devices.

In the host device, the host transceiver is arranged for transmitting and receiving the above messages. The host processor is arranged for processing the messages according to the predetermined protocol and the ranging protocol. Specifically, the host processor determines first time data representing a time interval between the first time t1 and the fourth time t4. Subsequently, in a message M2, the first time data is send to the mobile device, which may send an acknowledge message ACK2. For example, the first time data in message M2 contains the values of t1 and t4, or the interval between t1 and t4. Finally, the host processor receives a determined distance from the mobile device in a report, for example in a range report message RRP.

In the mobile device, the mobile transceiver is arranged for transmitting and receiving messages. The mobile processor is arranged for processing the messages according to the predetermined protocol and the ranging protocol. Specifically, the mobile processor determines second time data representing a time interval between the second time t2 and the third time t3. Subsequently, in the message M2, the mobile processor receives the first time data. Then the mobile processor determines the distance by determining a travelling time of the messages between the first device and the mobile device based on the first time data and the second time data. Finally, the mobile processor transfers the determined distance to the host device in a report, for example in the range report message RRP. Alternatively, the mobile device may transfer the second time data to the host device or a further distance calculation device, which respective device performs the calculation of the determined distance based on the second time data as received from the mobile device.

In order to accurately measure the round-trip time between the two wireless devices, it requires both wireless devices to participate in the time measurements, for example by measuring t1 and t4, or t2 and t3 in the exemplary FTM mechanism defined in IEEE 802.11REV-mc, and send the measurement data of the time instants (t1, t2, t3, t4), the intervals (t3−t2, t4−t1) or the resulting calculated distance to the other device. In FTM devices are called stations STA, and a Receiving STA can request a Sending STA to send FTM frames that contain a specific set of timing information, in particular t1 and t4 as described above. Based on the received timing information from the Sending STA and the local timing information t2 and t3 at the Receiving STA, the Receiving STA is able to measure the RTT at a granularity of 0.1 ns. Based on the RTT measurement, the Receiving STA is able to calculate its distance to the Sending STA very precisely. It is noted that the FTM procedure between two STAs can take place pre-association, i.e. before setting up a connection.

In FIG. 1, the host device 110 also has a user interface 113 having a connect button 115. The user interface may have a touch screen, various buttons, a mouse or touch pad, etc. The connect button may be a traditional physical button, a mechanical switch, a touch sensor, or a virtual button, e.g. on a touch screen or an icon to be activated via a mouse. The user interface may also be a remote user interface. The host processor is arranged to execute a connection sequence upon a user activating the connect button.

The connection sequence involves a sequence of actions. First, by communicating to respective mobile devices in wireless communication range, one or more respective distances are determined. Each respective distance is between the host and a respective mobile device. The distances may be determined as described above according to the wireless ranging protocol. Subsequently, a shortest distance is selected among the respective distances that have been found. If only one device is in range, and only one distance is determined, the distance is considered to be the shortest. Next a first mobile device is identified among the respective devices. The first mobile device has said shortest distance. Finally, a connection action is executed according to the communication protocol regarding a connection between the first mobile device and the host device. For example, a connection is set up, or an existing connection is terminated. Further examples are discussed below. Now a practical example of single button activation and distance based control for a docking system is discussed.

A wireless dock may be equipped with a single dedicated button for docking. Such a button B may physically be attached to the wireless dock W. When B is pressed, the dock captures a user intent of wireless docking a portable device with that wireless dock in an intuitive and secure way. A connection sequence may be executed in the following stages. The host device determines the distance between itself and all devices within wireless range capable of wireless docking.

Optionally, the host may determine which devices have a distance within a predetermined connection range. For example, the connection sequence may comprise determining whether the shortest distance is more than a predetermined connection range. If so, the connection sequence may continue by aborting the connection sequence. Also, the connection action may comprise signaling to the user that the mobile device is outside the predetermined connection range, or indicating to the user that the mobile device has to be moved towards the host. Also, the connection action may comprise, for a limited period, repeating the stages of determining the respective distances and selecting the shortest distance, until the shortest distance is less than the predetermined connection range, and if so, continue by executing the connection action.

Optionally, the host may determine which devices are part of an authenticated device list. For example, the connection action may comprise authenticating the first device according to the communication protocol. Also, the connection action may comprise determining whether the first device is part of an authenticated device list, and if not, upon successful authentication of the first device, updating the authenticated device list. Also, the connection action may comprise determining whether the first device is part of an authenticated device list, and if so, reusing previously established credentials for setting up a connection to the first device. If only a single device is found, then pressing button B may trigger a procedure to securely authenticate and/or set up a connection to the single device. If the single device is part of an authenticated device list, previously established credentials may be used. If the single device is currently connected to the host, then pressing the connect button may disconnect the device.

By performing wireless docking in this way, the user experiences that a single button click is sufficient to trigger a docking action, and there is no need to perform any other steps. During the connection sequence, a "connecting" message may be shown on a display to inform the user that everything is going according to plan. Also, audio feedback related to the docking procedure may be provided. For example, the dock or the dockee may make a clicking sound when docking successful, e.g. a sound similar as to when physically clicking into a wired dock Also, during connection to avoid errors in connection, the docking station may display a message on display for a predetermined period indicating the device to which a connection is made and may ask the user to confirm or cancel, e.g. by pressing twice or a long press, the connect button to cancel the present docking procedure. Then, a list of other devices with which a connection is possible may be shown. For establishing such a list, a larger connection range may be enabled.

Optionally, either a double press, a long press or a second button may be used to initiate disconnection. Such a different operation avoids confusion between an intention to connect and an intention to disconnect, e.g. due to a user not realizing that another device may still have a connection.

Optionally, the number of devices allowed to be within connection range may be limited. For example, the connection sequence may comprise determining a total number of mobile devices within a predetermined connection range. If the total number exceeds a predetermined number, the connection sequence may continue by signaling to the user that connection range. Also, if the total number exceeds a predetermined number, the connection sequence may continue to request the user to remove one or more mobile devices from the connection range. Also, if the total number exceeds a predetermined number, the connection sequence may be aborted. Also, if the total number is one, the connection sequence may continue by executing said connection action while skipping said selecting and identifying. Based on limiting the total number of devices, there are less possible mistakes such as connecting to a non-intended device. Also, the time required for push button activated connection sequence can become relatively short, e.g. in push-button pairing compared to about 2 minutes that the WPS specification demands.

Optionally, the host or the mobile may give instructions to the user to move a device out of a pre-configured range too many devices are within the preconfigured range and the dock cannot decide which one to take, for example if the distance measurement is not accurate enough to distinguish the distance of multiple devices within a close range (e.g. if the error margin/granularity is e.g. 1 m).

In practice, the user does need to be aware of the state of docking. Optionally, the button and/or the user interface may indicate a state of docking, e.g. by a flashing light, a colored light, a pictogram that is lit or not, two different pictograms, etc.

In an embodiment, a host device W operates as follows upon pressing button B. A subset S contains mobile devices that have been detected for wireless communication, e.g. discovered, by the host W. Distances to the devices in S are determined via the ranging protocol. A mobile device Y has the shortest distance to device W and device Y is not already connected to a dock. The device W now triggers setting up a docking connection to device Y. The host W may store a list AL of authenticated devices, and store identity data and credentials for the authenticated devices. Previously established credentials may be re-used for setting up the connection.

Optionally, host device W may be arranged to act as follows. When host device W is connected to a mobile device Z< >Y at the moment button B is pressed, then W disconnects its docking connection with Z. The benefit of doing so, is that when two authenticated devices are within the predetermined range R of the dock, then it automatically will toggle between those two devices. Toggling, instead of allowing two devices to be simultaneously connected, facilitates an expected undock behavior that is the most likely user intent if the button is pressed whilst being docked.

The above described device, system and method for docking to a wireless dock, may also apply to other wireless I/O devices that have a connection related service running on the portable device. Upon connection, it is noticeable to the user that the wireless connected between the portable device's service and the wireless device's I/O function was successful, e.g. by the display output from the portable device automatically shown on the screen provided or attached to the wireless I/O device. Examples of such combinations of I/O device and service are Miracast, Wi-Fi Serial Bus, and Bluetooth audio.

Moreover, adding a dedicated button for docking to the portable device may confuse the user. For example, if multiple docks are within close range, e.g. in flex office, it is not clear which dock the user wishes to connect to. Also, given the trend to have as little buttons as possible on portable devices, it is unlikely that such dedicated button would be added.

Figure 3:
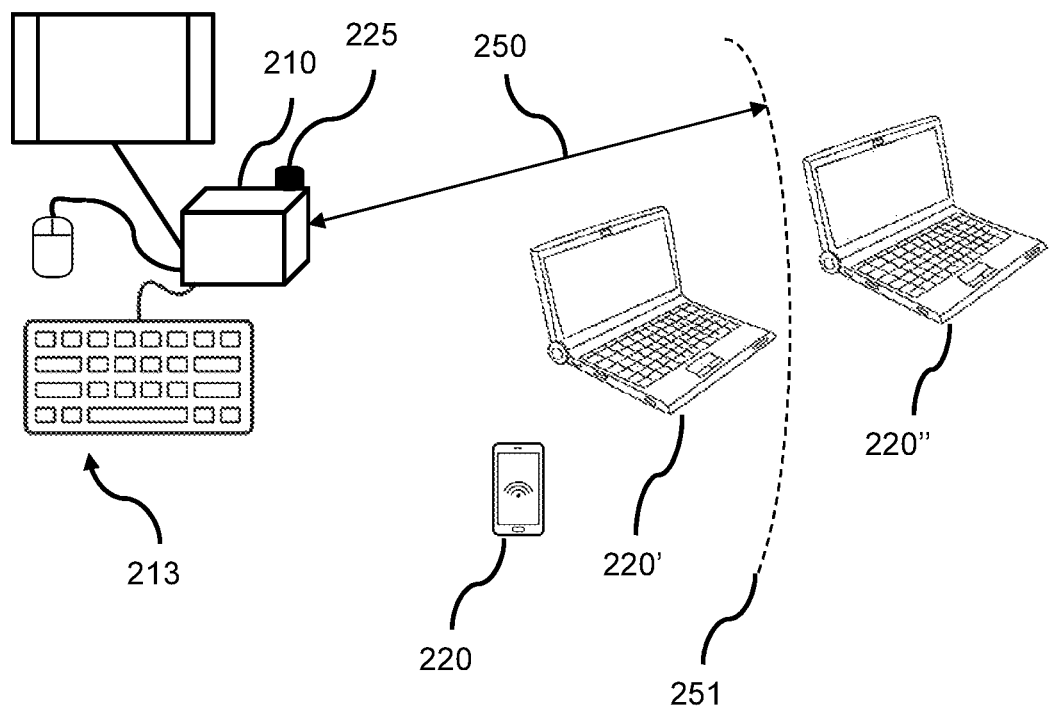
FIG. 3 shows an example of a docking system having a host and mobile devices.

FIG. 3 shows an example of a docking system having a host and mobile devices. In the Figure a host device W 210, for example a personal computer (PC) coupled to various peripherals {P1, . . . , Pn}. Examples of peripherals include display, keyboard, mouse, webcam, storage device, microphone, audio speakers. A user interface 213 may have a keyboard, a display, a mouse and a physical connect button 225, as described above. Alternatively, a button or function key on the keyboard may be assigned to function as a connect button, or a sensitive pad, touch panel, fingerprint sensor or any other surface or actuator that can be used as a virtual connect button to start the connection sequence. The connect button may also be constituted by an icon on the display to be activated by a mouse cursor being positioned and a mouse click. Device W may host a wireless docking server function capable of enabling the I/O peripherals to be operated by a portable device over a wireless connection between device W and the portable device e.g. using protocols such as Miracast, Wi-Fi Serial Bus. The wireless connection may for example be a Wi-Fi Infrastructure connection, Wi-Fi Direct connection, Wi-Fi Aware data connection, Bluetooth connection.

The Figure also shows multiple mobile devices {D1, . . . , Dn}, including a mobile phone 220, and a first laptop 220' and a second laptop 220". The figure also schematically shows a connection range 250 by an arrow and a dashed boundary 251. The second laptop 220" is outside the connection range 250. Host device W is further capable of detecting a set of devices {D1, . . . , Dn} within wireless range, which devices are capable of wireless connecting or docking. This can be achieved by exposing the wireless docking capability using a pre-association discovery service discovery mechanism, using for example Application Service Platform mechanism of performing matching a hash of a service name by a service seeker with an advertiser that hosts a service with that name using e.g. 802.11 Probe Request/Response frames, 802.11 beacon frames, 802.11 GAS Request/Response frames, Bluetooth, NFC, Wi-Fi Aware Service Discovery frames. The service discovery may also be done by using a post-association service discovery mechanism, e.g. using UPnP or mDNS. The pre-association service discovery mechanism typically enables exposing additional information about the service. This may include information about whether or not the device is already docked with a dock, whether or not it can accommodate an additional connection for docking, whether the device has enough available resources to dock, which dock the device is currently docked with (if any), and also other detailed docking capabilities supported by the device.

Host device W is further capable of performing distance measurement with devices {D1, . . . , Dn}. Distance measurement can be achieved by using the 802.11 fine timing measurement (FTM) distance measurement mechanism (e.g. as used within Wi-Fi Location and Wi-Fi Aware ranging), either by performing the FTM procedure directly between Device W and devices D1, . . . , Dn, or by the device W requesting another device (e.g. a nearby WLAN Access Point to which device W is connected) to provide distance/location data of devices D1, . . . , Dn. The distance may also be determined for example by using iBeacons, or by retrieving GPS data related to D1, . . . , Dn that may be exposed by those devices to device W, or any other mechanism that can provide precise indoor positioning (preferably with a minimum accuracy of approximately 1 meter or better). Based on these distance measurements device W determines which subset S of the set of devices {D1, . . . , Dn} have a distance within a predetermined range R. Optionally, devices that are already connected to another wireless dock, or to another host (not host device W) are skipped and do not take part in determining which devices are closest to device W and should not be included in subset S, i.e. to not unnecessarily wrongfully request a connecting to any neighboring devices, e.g. in a flexible office.

Also, one or more mobile devices may be discovered that do not support distance measurement. The host processor may be arranged to make a distinction between devices with which device W can perform distance measurement and which ones don't, and treat them differently. For example, if distance measurement is not supported by device Q, then device Q may be excluded from the one-button press connecting procedure. For example, a message may be shown on the display of device Q or the host that setting up a connection to that device requires a different procedure.

In a further embodiment device W is arranged to visually mark the range R to users of mobile device, e.g. by illuminating a range that is being scanned for discovery of portable devices, or showing on a display a map of the room and the area that is covered by range R.

An embodiment of a wireless communication system includes a host device W operating as a wireless dock and a mobile device Dx exposing over the wireless network that it is capable of setting up a wireless docking connection with a wireless docking server. The mobile device is capable of taking part in distance measurement with other wireless devices. In a connection sequence, triggered upon pressing the connect button, host device W determines the distances between device W and devices {D1, . . . , Dn}, and may determine which subset S of the set of devices {D1, . . . , Dn} have a distance within a predetermined connection range R 250. The device W may further determine which subset T of subset S are mobile devices that are part of an authenticated device list AL for device W. Based on the distances a closest device Dx is selected to become a dockee. Upon receiving an incoming connection request from wireless dock W, the mobile device Dx connects to the host device W and starts operating as a wireless docking client, e.g. using one or more of the I/O peripherals {P1, . . . , Pn} attached to device W.

The device W may operate as follows when button B is pressed and subset S only contains a single device Dx:

Device W triggers or takes part in the procedure to securely authenticate and set up a docking connection between device W and device Dx, if device Dx is not part of the authenticated list AL.

Device W triggers setting up a docking connection to device Dx, reusing previously established credentials, if device Dx is part of AL.

Device W disconnects from device Dx, if device Dx is currently connected to device W.

Optionally, the connection sequence comprises detecting whether at least one respective mobile device exhibits a respective movement with respect to the host device, and, adapting the connection sequence in dependence on said respective movement. For example, an authentication procedure is performed between device W and device Dx. In the authentication procedure, device W may signal to the user to move device Dx, and only if device W detects that device Dx is moving and that all other devices in range R remain stationary it continues the device authentication procedure. Detecting said movement may be based on multiple distance measurements, or some other mechanism like Doppler shift of received signals. Optionally, W may compensate for its own motion by measuring its own motion with accelerometers, with wireless ranging measurements with devices that W knows are stationary, etc. Optionally, the connection sequence may be adapted by detecting whether said first device exhibits said movement, and only if so setting up a new connection between the first device and the host device. Also, the connection sequence may be adapted by detecting whether said first device exhibits said movement, and only if so authenticating said first device. Also, the connection sequence may be adapted by identifying a moving mobile device among the respective devices, the moving device exhibiting said respective movement and being different from the first mobile device, and subsequently selecting the moving mobile device for initiating a new communication session or selecting the moving mobile device for terminating an existing communication session.

Optionally, device W further operates as follows upon pressing B if S contains more than one device. Device W triggers setting up a docking connection to device Dy of subset S with the shortest distance to the dock that is not already connected to a dock (if any), reusing previously established credentials if Dy is on the list AL. Optionally, the devices in subset S but not on the list AL may be excluded from being selected for connection, or may require a further confirmation to be selected based on having the shortest distance. If device W is connected to a device Dz at the moment button B is pressed, then W may disconnect its docking connection with Dz.

In the above embodiments, in case subset S only contains a single device Dx, device W may operate as follows when button B is pressed. Device W triggers or takes part in the procedure to securely authenticate and set up a docking connection between device W and device Dx, if device Dx is not part of the list of authenticated devices for device W. If device Dx is currently connected to device W, device W may disconnect from device Dx.

Authenticating may involve using a WPS Push Button pairing, whereby the timeout for detecting a second device can be much shorter since both W and Dx are within arm's reach length and device W has already determined that device Dx is the only device within range R capable of setting up a docking connection. In another embodiment, device W may display a PIN or a QR code with credential information and/or instructions on how to pair the two devices (e.g. on a display attached to W), that are part of the WPS or DPP authentication procedure. Alternatively, device W may use keypad entry of a PIN, NFC, Fingerprint sensor, Ada, WFDS Default PIN, Diffie Hellman key exchange, or any other pairing method.

The above-mentioned authentication procedure may be executed before, or during, the connection setup, and may be initiated by device W or device Dx depending on the authentication mechanism. For example, a connection setup request is performed by an 802.11 Provision Discovery Request and/or a P2P GO negotiation and/or 802.11 Authentication Request and/or 802.11 Association request which includes the information about the service that the device wishes to connect to, in this case the docking service as advertised by the peer device.

In an embodiment, once the devices W and Dx are paired and connected, information of the peer device (e.g. device UUID, MAC address, service instance name, friendly name, product codes), information about the connection (e.g. the P2P group information) and credential information is stored by the host device and/or the mobile devices, e.g. maintaining a list of authenticated devices securely inside an internal storage, or on external storage. Such a list allows for faster connection setup and less user involvement when the same portable device docks with the same dock. The host device W may trigger setting up a docking connection to device Dx, reusing previously established credentials, if device Dx is part of the authenticated device list for device W.

Optionally, the ranging protocol comprises transferring respective credential data from the respective mobile devices and the host processor is arranged for using the respective credential data when executing the connection action for the respective device as selected based on the respective distances. For example, based on the authenticated device list AL, device W may retrieve information, including credential information, from its internal or external storage. The retrieval is based on identity data exposed by the discovered device Dx. Before issuing a connection request to a discovered device Dx, device W requests proof from device Dx that device Dx indeed has knowledge about the credential that was stored, and that it is not e.g. another perhaps malicious device that exposes the same information such as the MAC address previously stored. This can be achieved by sending a DPP Peer Discovery Request frame to the device Dx and check if the response if valid, or in general perform a challenge-response message exchange between device W and Dx based on the previously stored credential. Sending such messages before association may also be useful in case the device Dx has changed its MAC address since it was last docked with device W (e.g. for privacy reasons), and only part of the information (e.g. device UUID or service instance name) still matches. Furthermore, device Dx may have been reset in the meantime and may not have the information about previously established authentication and credentials for connecting to device W in its storage anymore. After establishing that device Dx indeed has knowledge about the previously stored credential, device W may request setting up a connection to device Dx and in particular its docking service, by sending a Provision Discovery Request with a request to re-initiate a persistent connection.

In an embodiment, the host is arranged to connect to authenticated devices. When multiple mobile devices are within connection range, e.g. a subset S, host device W may determine which subset T of subset S are devices that are part of the authenticated device list AL for device W. If S contains more than 1 device and T is not empty, then when button B is pressed, the host device may determine respective distances to each device of subset T. Then, device W triggers setting up a docking connection to device Dy of subset T with the shortest distance to the dock that is not already connected to a dock (if any), reusing previously established credentials. In case device W is connected to a device Dz at the moment button B is pressed, then W may disconnect its docking connection with Dz.

In an embodiment, if S contains more than 1 device, pressing button B triggers user feedback, e.g. shown on a display attached to device W, stating that multiple portable devices capable of docking have been found within docking range R and that there is ambiguity as to which portable device to connect to. The feedback may indicate that the user should move one of the devices out of range R or otherwise signal which to device the host device W should connect to, e.g. by placing it on a certain designated place, doing a particular movement, press a button on the device e.g. to expose a certain state as part of pre-association discovery information to device W, or to initiate a connection request from the portable device to device W. The feedback may also indicate that at least one other host is within close range. The host may communicate with other hosts in wireless connection range to coordinate transmissions and messages, e.g. the time intervals for protocol messages to prevent confusion, and/or request information from those other hosts (e.g. the proximity of portable devices).

In an embodiment, starting an unintended connection sequence for a device Y is prevented as follows. The host device may monitor positions and/or movements of various devices in reception range, and exclude or prioritize mobile devices based thereon. For example, if device Y has not recently moved, or if it is not lying very close to device Z that the host device is connected to or if another dock is currently initiating a connection to device Y, then the mobile device Y is excluded from the connection sequence. Also device Y may be excluded if it is already connected, e.g. by inspecting the availability status and/or docking status in the pre-association device or service discovery information provided by device Y to device W, or by inspecting the P2P group (Client/Group owner) information provided by device Y or by the neighboring docking station V provided through pre-association device or service discovery, or by inspecting provision discovery, GO negotiation, or Association messages between device Y and neighboring docking station V, or by requesting information directly from device Y or docking station V about their current connection status or docking status using dedicated messages (e.g. management frames).

Optionally, the host may be arranged to store timestamps for respective mobile devices indicating the last time the user was active on, or established a connection with, a certain device. The device most recently used may be selected as the device that the user wishes to dock. Optionally a precise location on the desk may be determined, e.g. using an adjacent access point or dock, and only connect if the mobile device is located exactly at a designated spot on the desk If no mobile devices are found within connection range and subset S is empty, device W may show information on a display attached to device W that devices capable of docking should be placed within the connection range R.

A mobile device has a mobile processor arranged for use in the above system as follows. The mobile device exposes over the wireless network that the mobile device is capable of setting up a wireless connection, e.g. with a wireless docking server. This may be done by the device advertising a docking service (e.g. using ASP P2P, Wi-Fi Aware, UPnP, mDNS). The mobile processor is further being capable of taking part in distance measurement with other wireless devices, e.g. by supporting the 802.11 FTM distance measurement procedure. Finally, the mobile processor is arranged to connect to a host device and to start operating one or more of the I/O peripherals {P0, . . . , Pn} attached to the host device. Such a connection sequence may be initiated, upon receiving an incoming connection request from wireless dock W, preferably without any further user interaction In an embodiment, the ranging protocol between a first and a second device comprises an additional attribute or additional message that may for example be added to the ranging protocol as defined in IEEE 802.11 [ref.1], containing a credential (e.g. public key) or a hash of a credential or an encrypted credential. The second device has to include such credential or hash of a credential or an encrypted credential as part of the message exchange for the ranging protocol. To be symmetric, also the first device would have to include such credential, hash of a credential or encrypted credential. The preferred field containing the credential or hash of a credential or an encrypted credential in a message of the ranging protocol is a field of which the signal or at least part of the signal transferring that field is used to measure the transmit or arrival time of the message, so that it is very difficult if not impossible for another device to insert its credential or hash of its credential or its encrypted credential in a message that is used to measure distance between the first and second device. The closer (in time) that the signal carrying the credential or hash of a credential or an encrypted credential is to the signal that is used to measure range, or the more overlap between these signals, the better. This way, the first device can be certain that the credential or hash of a credential or an encrypted credential in a message of the ranging protocol is indeed the one of the second device with which it is executing the range measurement protocol. In one embodiment, the first message processor is arranged to process this credential or hash of a credential or encrypted credential, and verifies if it matches a credential that has previously been used by a device with which it has successfully performed device authentication and established mutual trust, such as by using the Wi-Fi Protected Setup Protocol. Device Provisioning Protocol. Diffie-Hellman key exchange and/or the 4-way WPA2 handshake. If a match is found, the first device may assume that the distance measurements between the first and second device can be trusted and deemed reliable. If no match is found, the first device will distrust the distance measurements between the first and second device and perform additional steps to verify the reliability of the distance measurements, such as using the mechanisms as described in other embodiments. In another embodiment, the measured values as exchanged are encrypted using a key that was agreed or is derived from agreed credentials between the first and second device as established during an earlier device authentication procedure performed between the first and second device.

In an alternative embodiment, the second device has to include a credential or hash of credential or an encrypted credential that will be used during later connection setup. The first message processor is arranged to process and store the received credential or hash of credential or an encrypted credential in conjunction with the measured distance between the first device and the second device, in order to securely correlate the measured distances with the particular device that connects with that credential. Upon setting up the connection between the first and second device, the first device verifies if the same credential or a derivative thereof is used whilst performing the device authentication, such as during performing the Wi-Fi Protected Setup Protocol. Device Provisioning Protocol. Diffie-Hellman key exchange and/or whilst performing the 4-way WPA2 handshake. By doing so, the first device can determine that the device with which it is connecting, is the same device as for which a particular distance measurement was done. In particular, if the credential was a public key and if the setting up the connection between the first and second device included that the second device has successfully proved to device 1 that it has possession of the private key belonging to the public key as credential in the range measurement, the first device can be certain that the second device is the one that it measured the range to and not an imposter.

In a further embodiment, security of a connection may be enhanced as follows. Mobile device Dx may be arranged to keep track of which host device has performed a distance measurement via a ranging protocol such as the FTM procedure. The mobile device may perform its own distance measurements, and correlate the host measured distance with its own distance measurements. If there is a substantial difference between the host measurement and the mobile measurement, the connection setup is aborted. The mobile device may be arranged to subsequently check if the incoming connection or authentication request is indeed coming from the dock, and that it is not approached by a second device within a preconfigured time period.

In a further embodiment, the host device and mobile device may be arranged for enhanced security during setting up a connection as follows. During the ranging protocol, as part of one of the ranging messages, identity data and/or credentials of the host device and/or mobile device are exchanged. Such identity data or credentials may be cryptographically protected and/or linked to other parts of the protocol messages in the ranging protocol. When, at a later time, the mobile device is selected for setting up a connection, the exchanged identity data and/or credentials is again used for the authentication. For example, a hash of the public key from the dock may be received during distance measurements, and used for a challenge-response protocol or for verification during connection setup. Effectively, the devices may now verify whether the devices taking part in said distance measurement are the same devices now being authenticated. By making a distance based measurement more trustworthy, it becomes a viable tool for reliable proximity based services. An example use case is, if you connect to a nearby wireless keyboard, nearby wireless storage device, nearby sensor or nearby wireless webcam, you want to be sure that you connect to the correct one, and not to some man-in-the-middle device that wants to monitor, copy or trace what you are doing.

In a further embodiment, the distance measurements may be performed involving at least three devices. Also, malicious or unintentional connections may be prevented by not allowing two docks to approach the mobile device within a certain specified short time frame, e.g. for distance measurement or connection setup.

In a multi-device configuration, a first device may perform distance measurement with a third device in order to decide to set up a connection between the first and third device. In this case, when the first device or third device are approached also by a second device to perform distance measurement, it is beneficial if the first device would be able to verify whether the second and third device are operating independently or whether they are cooperating to perform distance measurement (i.e. by the second and third device sending/receiving distance measurement data to/from each other resulting from performing distance measurement by the second device with the first device and/or by the third device with the first device) and if the third device would be able to verify whether the first and second device are operating independently or are cooperating to perform distance measurement. If they are not cooperating, the second device may be a hostile device that tries to impersonate the first or third device by making the measuring device believe that it is at a similar distance as the impersonated device, or that it tries to make the measurement device believe it is actually closer than the impersonated device, by doing its own distance measurements. In a possible embodiment, a device may be configured to reject distance measurement request frames and/or reject authentication requests from the other two devices and/or reject setting up a connection to the other two devices if the device receives distance measurement frames from two or more different devices within a specified short time period, or if the distance measurement request frames from the two or more different devices arrive at an earlier time than a preconfigured time after the first of those two devices has started sending its measurement requests (e.g. in case it was agreed in the protocol that two devices that cooperate to perform distance measurements have to issue their measurement frames at least a certain specified time period after each other and coordinate their measurements accordingly).

In another possible embodiment, if two devices are cooperating to perform distance measurements with a third device, these devices both have to include a common credential (e.g. common symmetric key, public/private key pair) or hash of credential or encrypted credential as part of the distance measurement protocol that they are executing with the third device, that can be verified by the third device for their validity when receiving the distance measurement request frames from both devices, by performing a challenge-response exchange between the third and the first device based on that received credential and a challenge-response exchange between the third and the second device based on that received credential. Hence this embodiment relates in addition to a method and a first device for deciding whether to accept the setup of a wireless connection between the first device and a second device, where the first device is approached also by a third device to perform distance measurement, the method comprising:

cooperating with the second and third device in performing at least a distance measurement with respect each of to the second and third device;

receive distance measurement frames from the second and the third device different devices;

deciding not to accept the setup of the wireless connection if at least one of the following conditions is met;

a) the received distance measurement frames are receiving within a predetermined time period, b) the distance measurement request frames from the two or more different devices arrive at an earlier time than a preconfigured time after the first of those two devices has started sending its measurement requests.

Alternatively, the device that receives the distance measurement request frames and the common credential, hash of credential or encrypted credential from the other two devices rejects setting up a connection with any of those two devices if the common credential or a derivative thereof is not used or cannot be correctly verified to be used whilst performing the device authentication between the device and each of the other two devices, such as during performing the Wi-Fi Protected Setup Protocol, Device Provisioning Protocol, Diffie-Hellman key exchange and/or whilst performing the 4-way WPA2 handshake. A method for deciding whether to accept the setup of a wireless connection between the first device and either a second device or a third device may comprise:

cooperating with the second and third device in performing distance measurements with respect each of to the second and third device;

receiving a common credential of the second and third device;

deciding not to accept the setup of the wireless connection if the common credential or a derivative thereof is not used or cannot be correctly verified to be used whilst performing the device authentication between the device and each of the other two devices.

Figure 4:
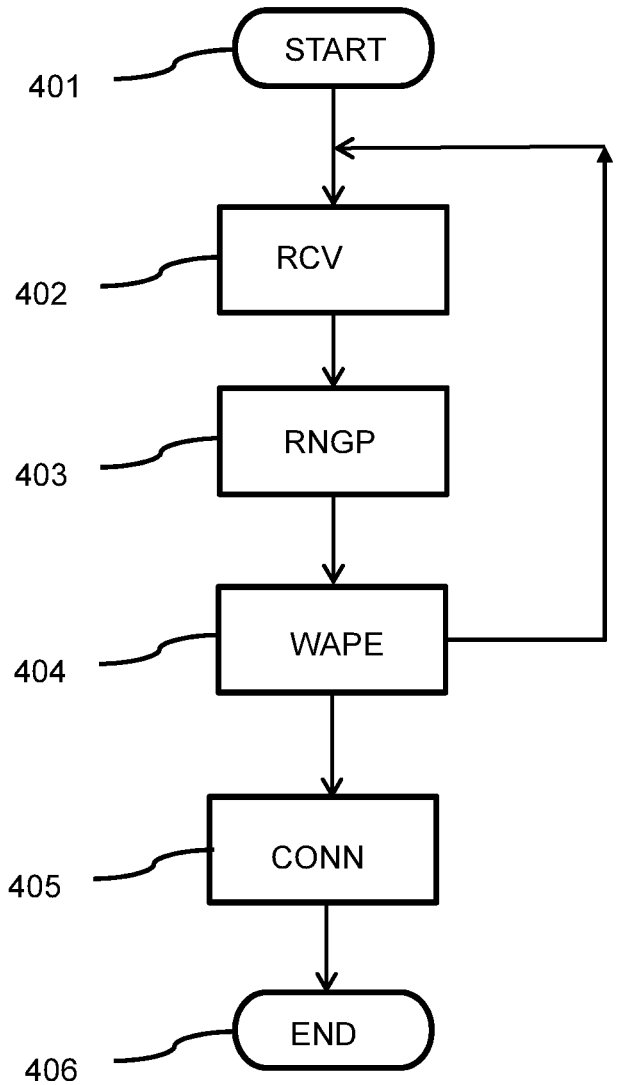
FIG. 4 shows a method for a mobile device enabled for single button connection.

FIG. 4 shows a method for a mobile device enabled for single button connection. First a distance measurement is performed according to a ranging protocol between a device acting as host device and a further device acting as mobile device. The devices are physically apart at a distance 140. The ranging protocol is for determining a distance between the first and the second device. The first device and the second device are similar to the first and second device as shown in FIG. 1 and further described with reference to the FIGS. 1-3. The method may be executed by a mobile processor in the mobile device It is noted that the ranging protocol and distance measurements may also be executed by a processor in a different device and/or at a different time based on the received values. For example, the method may be executed at a third device that is not actively participating in the ranging protocol, but receives all messages and is aware of the distance between the third device and the third device. If at a close distance to the first device, the third device can verify all data by receiving the protocol messages of the ranging protocol.

The method in the mobile device starts at node START 401. In a first stage RCV 402 the mobile device receives a message from the host to initiate the ranging protocol. In stage RNGP 403 the method may execute the ranging protocol and perform the time measurements as described with reference to FIG. 2. The method may in this stage obtain the determined distance, and transfer the distance to the host. Next, in stage WAPE 404, the method waits for a responsive period to receive a connection message from the host device. The responsive period starts upon said executing the ranging protocol. The connection message from the host relates to a connection with the host. If no message is received, the method resumes its initial state being responsive to the ranging protocol. Next, if a connection message is received, in stage CONN 405, the method continues by executing a connection action regarding a connection between the first mobile device and the host device. The connection message may contain distance measurement data or credential data, which may be verified and/or used at the mobile device. For example, the host may send a connection request to the mobile device, including credential data. The mobile device may execute a connection step in response to the connection message, and may use and/or verify the credential data. The method now terminates at node END 406.

Figure 5:
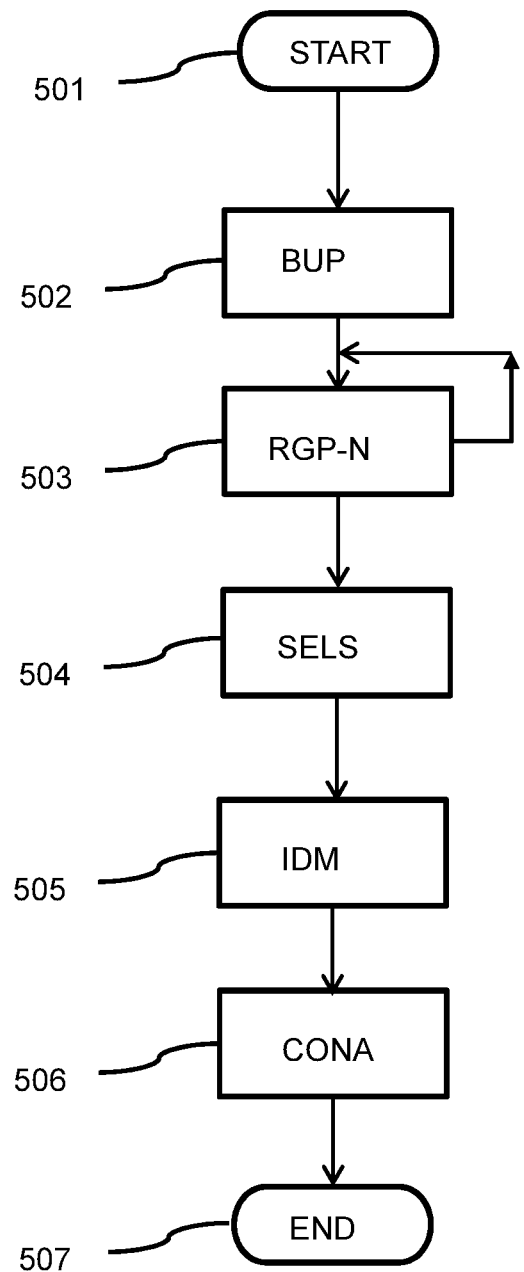
FIG. 5 shows a method for a host device enabled for single button connection.

FIG. 5 shows a method for a host device enabled for single button connection. The host device is provided with a user interface including the connect button as described above. A distance measurement is performed by communicating to a mobile device according to a ranging protocol as described above.

The method starts at node START 501. In a first stage BUP 502 the method is controlling the user interface and monitoring the connect button. When the user presses the button, the stage detects that a user activates the connect button. Next, a connection sequence is executed upon the user activating the connect button, the connection sequence comprising the following stages. In a first stage RGP-N 503 the host device executes the ranging protocol with one or more respective mobile devices in wireless communication range. According to the ranging protocol one or more respective distances are determined. Each respective distance is between the host and a respective mobile device. Next, in stage SELS 504 a shortest distance is selected among the respective distances. Next, in stage IDM 505 a first mobile device is identified among the respective devices, the first mobile device having said shortest distance. Subsequently, in stage CONA 506, a connection action is executed regarding a connection between the first mobile device and the host device. The method now terminates at node END 507.

Computer program products, downloadable from a network and/or stored on a computer-readable medium and/or microprocessor-executable medium, are provided that comprise program code instructions for implementing the above methods when executed on a computer for protecting location information, as elucidated further below.

The above system may be applied, for example, in indoor and outdoor short range wireless communication systems, where measuring distance is supported via a ranging protocol. For example, the system can be applied in portable devices and stationary devices supporting Wi-Fi, Wi-Fi Aware, or Wi-Fi Direct. The ranging protocol may make use of established RF communication standards such as 802.15.7, 802.11, 802.15.4, ZigBee, Thread or Bluetooth® Low Energy (BLE) also known as Bluetooth® Smart.

Typically, the host device and the mobile device that interact to measure the distance and execute the connection sequence upon pressing the connect button, each comprise a processor which executes appropriate software stored at the devices; for example, that software may have been downloaded and/or stored in a corresponding memory, e.g., a volatile memory such as RAM or a non-volatile memory such as Flash (not shown). The devices and servers may for example be equipped with microprocessors and memories (not shown). Alternatively, the devices and server may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

Many different ways of executing the method are possible, as will be apparent to a person skilled in the art. For example, the order of the stages or steps can be varied or some stages may be executed in parallel. Moreover, in between steps other method steps may be inserted. The inserted steps may represent refinements of the method such as described herein, or may be unrelated to the method.

A method according to the invention may be executed using software, which comprises instructions for causing a processor system to perform the respective method. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method according to the invention may be executed using a bit stream arranged to configure programmable logic, e.g., a field-programmable gate array (FPGA), to perform the method. It will be appreciated that the software may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 6A:
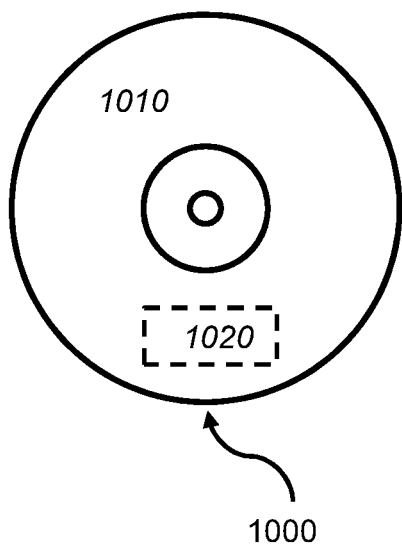
FIG. 6a shows a computer readable medium.

FIG. 6a shows a computer readable medium 1000 having a writable part 1010 comprising a computer program 1020, the computer program 1020 comprising instructions for causing a processor system to perform one or more of the above methods in the system as described with reference to FIGS. 1-5. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 6B:
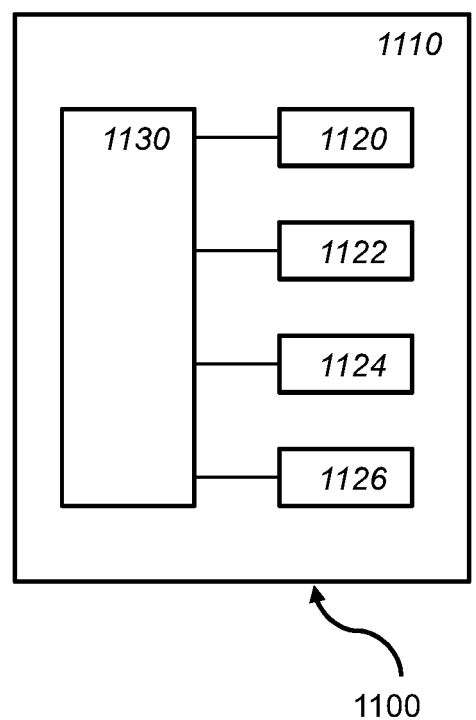
FIG. 6b shows in a schematic representation of a processor system.

FIG. 6b shows in a schematic representation of a processor system 1100 according to an embodiment of the device or server as described with reference to FIGS. 1-5. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

In summary, a wireless communication system has a host device and mobile devices arranged for wireless communication and for distance measurement. The host device has a user interface comprising a connect button, and is arranged to execute a connection sequence upon a user activating the connect button. The connection sequence first determines respective distances between the host and respective mobile devices. A shortest distance is selected and a first mobile device is identified having the shortest distance. Then a connection action is executed regarding a connection between the first mobile device and the host device. The mobile device is arranged for executing a ranging protocol and, upon subsequently receiving a connection message, executing a connection action regarding a connection between the first mobile device and the host device. Effectively a connection is established upon the user of a mobile device pressing a single button on a selected host device.

The following clauses are not the claims, but relate to various embodiments of the invention. The Applicant hereby gives notice that new claims may be formulated to such clauses and/or combinations of such clauses and/or features taken from the description, during prosecution of the present application or of any further application derived therefrom.

1. Host device arranged for wireless communication with mobile devices,
　each mobile device (120,120') comprising a mobile transceiver (121) and a mobile processor (122),
　the mobile transceiver being arranged for wireless communication according to a communication protocol,
　the mobile processor being arranged for distance measurement via a ranging protocol for determining a distance between the host and the mobile device based on a round trip time measurement,
　the host device (110) comprising
　a host transceiver (111) for wireless communication according to the communication protocol,
　a host processor (112) arranged for distance measurement via the ranging protocol, and
　a user interface (113) comprising a connect button (115),
　the host processor being arranged to execute a connection sequence upon a user activating the connect button,
　the connection sequence comprising
　determining, by executing the ranging protocol with respective mobile devices in wireless communication range, one or more respective distances, each respective distance being between the host and a respective mobile device,
　selecting a shortest distance among the respective distances,
　identifying a first mobile device among the respective devices, the first mobile device having said shortest distance, and
　executing a connection action regarding a connection between the first mobile device and the host device.

2. Host device as defined in clause 1, wherein the connection sequence comprises
　determining whether there is an existing communication session between the first device and the host device according to the communication protocol, and if not, the connection action comprising
　initiating a new communication session between the first device and the host device according to the communication protocol.

3. Host device as defined in clause 1 or 2, wherein the connection sequence comprises,
　determining whether there is an existing communication session between the first device and the host device according to the communication protocol, and if not,
　determining whether there is a further communication session between a further mobile device and the host device according to the communication protocol, and if so, the connection action comprising
　initiating terminating the further communication session between the further device and the host device.

4. Host device as defined in any of the preceding clauses, wherein the connection sequence comprises
　determining whether there is an existing communication session between the first device and the host device according to the communication protocol, and if so, the connection action comprising initiating terminating the existing communication session between the first device and the host device according to the communication protocol.

5. Host device as defined in clause 4, wherein the connection sequence comprises, when there is an existing communication session between the first device and the host device,
 selecting a second shortest distance among the respective distances,
 identifying a second mobile device among the respective devices, the second mobile device having said second shortest distance, and
 initiating a new communication session between the second device and the host device according to the communication protocol.

6. Host device as defined in any of the preceding clauses, wherein the connection action comprises at least one of
 authenticating the first device according to the communication protocol;
 determining whether the first device is part of an authenticated device list, and if not, upon successful authentication of the first device, updating the authenticated device list;
 determining whether the first device is part of an authenticated device list, and if so, reusing previously established credentials for setting up a connection to the first device.

7. Host device as defined in any of the preceding clauses, wherein the connection sequence comprises
 determining whether the shortest distance is more than a predetermined connection range, and if so, continue by at least one of
 aborting the connection sequence;
 signaling to the user that the mobile device is outside the predetermined connection range;
 indicating to the user that the mobile device has to be moved towards the host;
 for a limited period, repeating the stages of determining the respective distances and selecting the shortest distance, until the shortest distance is less than the predetermined connection range, and if so, continue by executing the connection action.

8. Host device as defined in any of the preceding clauses, wherein the connection sequence comprises
 determining a total number of mobile devices within a predetermined connection range, and continue by at least one of
 if the total number exceeds a predetermined number, signaling to the user that total number exceeds a predetermined number of devices allowed inside the predetermined connection range;
 if the total number exceeds a predetermined number, to request the user to remove one or more mobile devices from the connection range;
 if the total number exceeds a predetermined number, aborting the connection sequence;
 if the total number is one, continue by executing said connection action while skipping said selecting and identifying.

9. Host device as defined in any of the preceding clauses, wherein the connection sequence comprises
 detecting whether at least one respective mobile device exhibits a respective movement with respect to the host device, and,
 adapting the connection sequence in dependence on said respective movement.

10. Host device as defined in clause 9, wherein the connection sequence is adapted by at least one of:
 detecting whether said first device exhibits said movement, and only if so setting up a new connection between the first device and the host device;
 detecting whether said first device exhibits said movement, and only if so authenticating said first device;
 identifying a moving mobile device among the respective devices, the moving device exhibiting said respective movement and being different from the first mobile device, and subsequently at least one of
 selecting the moving mobile device for initiating a new communication session;
 selecting the moving mobile device for terminating an existing communication session.

11. Host device as defined in any of the preceding clauses, wherein the ranging protocol comprises transferring respective credential data from the respective mobile devices and the host processor is arranged for using the respective credential data when executing the connection action for the respective device as selected based on the respective distances;
 or
 the host processor is arranged for receiving at least one additional distance as measured by a mobile device and for using the additional distance when determining the respective distance between the host and a respective mobile device.

12. Wireless communication system comprising a host device (110) and a mobile device (120,120'),
 the host device comprising
 a host transceiver (111) for wireless communication according to a communication protocol,
 a host processor (112) arranged for distance measurement via the ranging protocol, and
 a user interface (113) comprising a connect button (115),
 the host processor being arranged to execute a connection sequence upon a user activating the connect button,
 the connection sequence comprising
 determining, by communicating to respective mobile devices in wireless communication range, one or more respective distances, each respective distance being between the host and a respective mobile device,
 selecting a shortest distance among the respective distances,
 identifying a first mobile device among the respective devices, the first mobile device having said shortest distance, and
 executing a connection action regarding a connection between the first mobile device and the host device;
 the mobile device comprising a mobile transceiver (121) and a mobile processor (122),
 the mobile transceiver being arranged for wireless communication according to the communication protocol,
 the mobile processor being arranged for
 executing the ranging protocol;
 receiving a connection message from the host device within a responsive period starting upon said executing the ranging protocol; and, in response to the connection message,
 executing a connection action regarding a connection between the mobile device and the host device.

13. Host method for use in a host device (110) for wireless communication with mobile devices (120,120'),
 each mobile device comprising a mobile transceiver (121) and a mobile processor (122),
 the mobile transceiver being arranged for wireless communication according to a communication protocol, the mobile processor being arranged for distance measurement via a ranging protocol for determining a distance between the host and the mobile device based on a round trip time measurement,
the host device comprising
a host transceiver (111) for wireless communication according to the communication protocol,
a host processor (112) arranged for distance measurement via the ranging protocol, and
a user interface (113) comprising a connect button (115),
the host method comprising
detecting a user activating the connect button, and
executing a connection sequence upon the user activating the connect button,
the connection sequence comprising
determining, by executing the ranging protocol with respective mobile devices in wireless communication range, one or more respective distances, each respective distance being between the host and a respective mobile device,
selecting a shortest distance among the respective distances,
identifying a first mobile device among the respective devices, the first mobile device having said shortest distance, and
executing a connection action regarding a connection between the first mobile device and the host device.

14. Mobile method for use in a mobile device for wireless communication with a host device,
the mobile device (120,120') comprising a mobile transceiver (121) and a mobile processor (122),
the mobile transceiver being arranged for wireless communication according to a communication protocol,
the mobile processor being arranged for distance measurement via a ranging protocol for determining a distance between the host and the mobile device based on a round trip time measurement,
the host device (110) comprising
a host transceiver (111) for wireless communication according to the communication protocol,
a host processor (112) arranged for distance measurement via the ranging protocol, and
a user interface (113) comprising a connect button (115),
the host processor being arranged to execute a connection sequence upon a user activating the connect button, the connection sequence comprising
determining, by executing the ranging protocol with respective mobile devices in wireless communication range, one or more respective distances, each respective distance being between the host and a respective mobile device,
selecting a shortest distance among the respective distances,
identifying a first mobile device among the respective devices, the first mobile device having said shortest distance, and
executing a connection action regarding a connection between the first mobile device and the host device,
the mobile method comprising
executing the ranging protocol;
receiving a connection message from the host device within a responsive period starting upon said executing the ranging protocol; and, in response to the connection message,
executing a connection action regarding a connection between the first mobile device and the host device.

15. Computer program product downloadable from a network and/or stored on a computer-readable medium and/or microprocessor-executable medium, the product comprising program code instructions for implementing a method according to clause 13 or 14 when executed on a computer.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the word 'comprising' does not exclude the presence of elements or steps other than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software, and a processor may fulfill the function of one or more units, possibly in cooperation with hardware elements. Further, the invention is not limited to the embodiments, and the invention lies in each and every novel feature or combination of features described above or recited in mutually different dependent claims.

The invention claimed is:
1. A host device comprising:
a transceiver, and
a processor,
wherein the transceiver is configured to wirelessly communicate with one or more mobile devices according to a communication protocol,
wherein the processor is configured for distance measurement via a ranging protocol for determining a distance between the host device and each of the one or more mobile devices based on a round trip time measurement,
responsive to the round trip time measurement exceeding a distance threshold, sending a notification to via the host device indicating that at least one of the one or more mobile devices has to be moved closer to the host device, and
wherein the processor is further configured to:
cause the transceiver to execute the ranging protocol to determine a distance measurement to each of the one or more mobile devices;
identify a first mobile device of the one or more mobile devices based on detected movement of the first mobile device, wherein the detected movement of the first mobile device is based on a difference between two or more of the determined distance measurements to the first mobile device; and
initiate a communication session with the first mobile device.

2. The host device of claim 1, wherein the host device includes a connect button, and the process or causes the transceiver to execute the ranging protocol based on activation of the connect button.

3. The host device of claim 1, wherein the processor determines a subset of the one or more mobile devices based on a selection criterion, and the processor identifies the first mobile device from among the subset.

4. The host device of claim 3, wherein the selection criterion for each mobile device includes at least one of:
- whether the mobile device is within a maximum distance limit, and
- whether the mobile device is not coupled to another host device.

5. The host device of claim 1, wherein the host device comprises a user interface, and if the processor determines that more than one mobile device is moving, the processor notifies a user to limit the movement to one mobile device before the processor initiates the communication session.

6. The host device of claim 1, wherein if the processor determines that more than one mobile device is moving, the processor selects a closest device to the host device that is moving as the first mobile device.

7. The host device of claim 1, wherein the processor identifies the movement of the first mobile device based on a predefined movement.

8. The host device of claim 7, wherein the predefined movement comprises at least one of:
- a predefined minimum distance, a predefined direction, and a predefined minimum speed.

9. The host device of claim 1, wherein initiating the communication session includes authentication of the first mobile device.

10. The host device of claim 1, wherein the ranging protocol includes a cryptographic sequence to validate an identity of each mobile device.

11. The host device of claim 1, wherein, after initiating the communication session, the host device detects a subsequent movement of the first mobile device and terminates the communication session based on the subsequent movement.

12. The host device of claim 1, wherein the host device comprises a docking device that facilitates communication between the first mobile device and one or more peripheral devices.

13. A method for establishing a communication session between a host device and a first mobile device among a plurality of mobile devices, comprising, by the host device:
- executing, via a transceiver of the host device configured to wirelessly communicate with the first mobile device, a ranging protocol configured to determine a distance measurement to each of the plurality of mobile devices based on a round trip time measurement;
- responsive to the round trip time measurement exceeding a distance threshold, sending a notification to via the host device indicating that at least one of the one or more mobile devices has to be moved closer to the host device, and;
- identifying the first mobile device of the plurality of mobile devices based on detected movement of the first mobile device, wherein the detected movement of the first mobile device is based on a difference between two or more of the determined distance measurements to the first mobile device; and
- initiating a communication session with the first mobile device.

14. The method of claim 13, comprising executing the ranging protocol only after detecting activation of a connect button on the host device.

15. The method of claim 13, comprising notifying a user that an identified device should be moved.

16. The method of claim 13, wherein if the host device determines that more than one mobile device is moving, the method comprises notifying a user to limit the movement to one mobile device before the processor initiates the communication session.

17. The method of claim 13, wherein if the host device determines that more than one mobile device is moving, the method comprises selecting a closest device to the host device that is moving as the first mobile device.

18. The method of claim 13, wherein the host device identifies the movement of the first mobile device based on a predefined movement.

19. The method of claim 13, wherein initiating the communication session includes authentication of the first mobile device.

* * * * *